Figure 1:
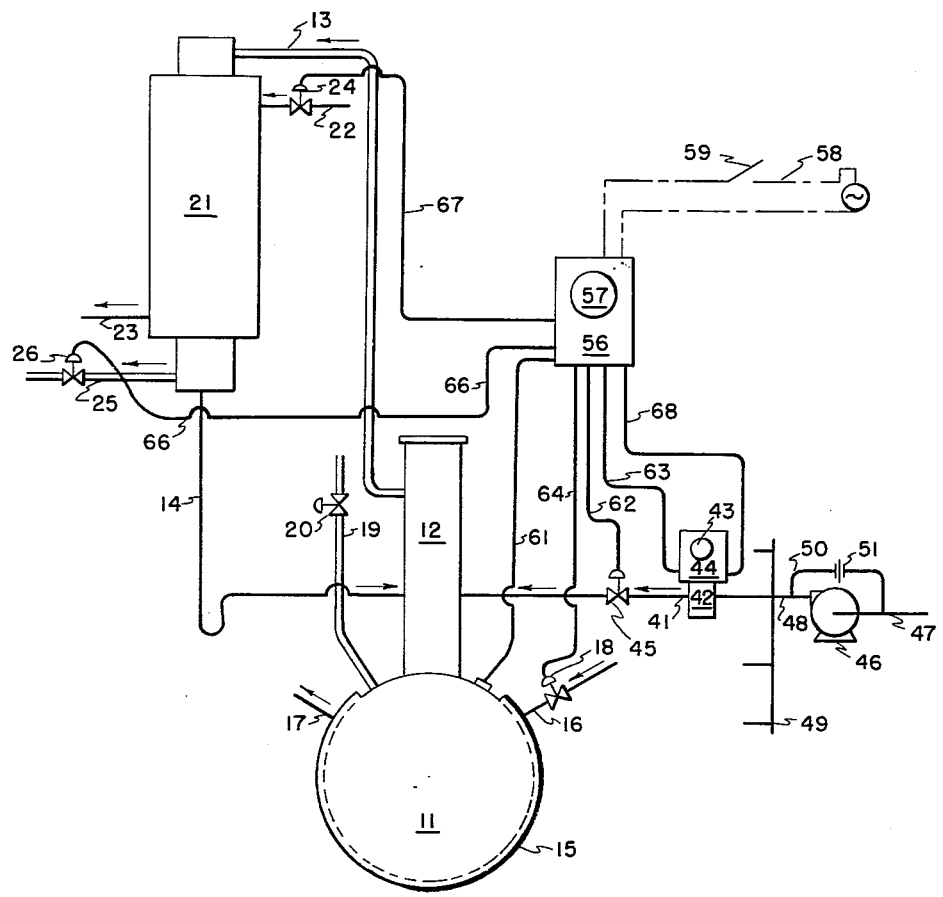

Oct. 31, 1961 W. E. GREEN 3,006,736
CHEMICAL REACTION CONTROL APPARATUS
Filed Dec. 2, 1958 3 Sheets-Sheet 1

Oct. 31, 1961  W. E. GREEN  3,006,736
CHEMICAL REACTION CONTROL APPARATUS
Filed Dec. 2, 1958  3 Sheets-Sheet 3

United States Patent Office

3,006,736
Patented Oct. 31, 1961

1

3,006,736
CHEMICAL REACTION CONTROL
APPARATUS
Warren E. Green, Baton Rouge, La., assignor to Ethyl Corporation, New York, N.Y., a corporation of Delaware
Filed Dec. 2, 1958, Ser. No. 777,773
4 Claims. (Cl. 23—253)

This invention relates to apparatus for effecting chemical reactions. More particularly, the invention relates to new apparatus for effectively and substantially automatically carrying out a batch reaction between a liquid reagent and a highly comminuted solid reagent, especially reactions having a varying pressure-time history, and producing minor amounts of inert gaseous by-products.

In a number of chemical processes, it is necessary to perform a reaction between liquids and finely divided solids under pressure. This is particularly true when the liquid reagent is a normally volatile substance, so that elevated pressure is necessary to provide contact between the liquid reactant and the solid reactant. In batch operations, particularly when either one or more of the initial reactants are toxic, or if the desired product is a toxic or hazardous material, particular precaution is required to maintain the reactants and reaction system in an isolated state at all times. Numerous examples of batch processes presenting these problems will be known to those skilled in the process industries. Among those which may be considered typical are the treatment of metallic salts with liquid acids to form a second desired salt and a volatile gaseous acid, the ethylation of a lead-sodium alloy with an ethyl halide or other liquid ethylating agent, and numerous other processes.

Generally in processes of this character, it is customary to initially charge the solid reagent and to feed the liquid reagent to the comminuted solids and conduct the reaction. During the initial introduction of the liquid, the reaction system is characterized by a very great excess of the solid reagent, and the finely divided solids present a very high surface area available for the reaction. The reaction will generally proceed quite rapidly during this portion of a cycle, but, because of the large physical and stoichiometric excess of solid reactant, efficient heat transmission is limited because of the paucity of a liquid phase. Upon continued introduction of a liquid reagent, the heat removal problem becomes simpler because of the presence of appreciable excess liquid which not only facilitates heat dissipation through the reaction mass, but, in addition serves as a vaporizable medium for removal of heat by vaporizing, condensing and refluxing. During the feed of the first part of the liquid, the temperature and pressure of the system will rise rather rapidly, and it is essential that the rate of feed be not in excess of the capacity of the reaction system and apparatus to safely distribute and dissipate the heat released. A further characteristic of many batch operations of the above character is the formation, during reaction, of small amounts of non-condensable by-product gases. These tend to build up in the reaction space and also to prevent efficient operation of the heat transfer equipment. Associated with this problem is the frequent use of an inert purge gas on the completion of a batch cycle. The residual inert gas remaining after a cycle

2 affects the heat removal effectiveness of the system in the same way as non-condensibles formed during reaction, and hence should be removed from the system.

Heretofore, it has been believed essential to provide manual control of reaction systems such as described above. This has been believed necessary particularly because of unbalance of the reaction system during the initial feed period. Hence, it has been customary to provide manual control of substantially the entire operation, including, especially, the feed of the liquid reagent. The necessity of such detailed manual control limits the effective utilization of personnel and in addition means that process efficiency hinges to a great extent on human judgment.

A need has therefore existed for apparatus for conducting reactions between solids and liquids which largely minimizes the amount of individual operational control manually exercised over the process, but which nevertheless avoids the difficulties associated with the tendency of the temperature and pressure to depart from a safe maximum rate of change, particularly during the initial feeding period of the process. Hence, an object of the present invention is to provide new and improved apparatus for conducting reactions. A more particular object is to provide a controlling system and apparatus for the control of flow of a stream of fluid which has an effect on the process, typical examples of such fluids being inert gas or reaction by-product gases, and coolant liquids such as water or heat transfer liquids. A particular object of certain embodiments is to provide a "fail safe" control system for the flow of such fluids. A further specific object of one particular type of embodiment is to provide a controlled venting system which automatically makes provision for the release of an inert purge gas in the reaction zone, followed by the controlled venting of inert by-product gases generated by the reaction. Other objects will appear hereinafter.

The present invention, as defined hereafter is a fluid flow control system applied to primary reaction apparatus, preferably in combination with certain other controlling means enumerated below. By primary apparatus is meant principally the apparatus units containing or directly processing the reagents. These include a reaction vessel or chamber, a reflux condenser, vapor and liquid lines to and from the condenser and reaction vessel. The reactor is desirably fitted with internal agitating means and usually with a jacket for flow of a heat transmission fluid for heating or cooling through the boundary of the reactor. Appropriate openings, with removable closures, are provided for feed of the comminuted solid reagents and for discharge of a reacted mixture. In many instances, the apparatus is provided with a vent line and a motored vent valve therein, for venting non-condensable gases or vapors from the system, the vent line usually connecting to the reflux condenser.

In addition to the primary apparatus the control means generally associated with the primary apparatus, are as follows:

(a) A primary controller for providing feed of liquid reagent to a reaction zone or vessel in such flow rate that non-uniform but pre-planned pressure time pattern is obtained, (b) A first limit controlling means for providing an elapsed time control overriding the controller (a), (c) A second limit controlling means for providing a total volume of liquid reagent control for a specific batch, overriding the controller (a), (d) A third limit controlling means for maintaining the process below a top or ceiling pressure, and for terminating or interrupting certain operations of the process apparatus and the several control devices.

It will be noted and understood more fully from the description hereafter that the foregoing overriding controllers ((b), (c), (d)) are concurrently operative, so that a multiple set of "ceilings" are imposed on the operation. In addition to the foregoing, the control apparatus includes:

(e) Means associated with apparatus for supplying liquid reagent at a pressure above the reactor operating pressure, these associated means serving to interrupt the time measurement and control of (b) and for interrupting, by discontinuance of flow, the feed of liquid reagent as in (a) if the pressure falls, and a fluid flow and control system therefor. As already stated, the fluid involved may be gaseous or liquid, and several embodiments of the invention can be provided in one process installation. For purposes of illustration, the apparatus is defined below for embodiments providing a vending and venting control system.

The apparatus of the present invention in all forms includes a motored valve in a conduit for transmitting the particular fluid. A vent valve in a vent line is a typical example. Activating means for actuating said valve, for example an air supply line or an electrical lead, are provided, dependent on the type of motor incorporated in said motored valve. Electrical means, e.g., a coil is provided for control of the actuating means, the coil being the first part of a circuit comprising two parts in series. The second part of the circuit includes two segments in series, an A segment and a B segment. The A segment has two branches, an A1 and an A2 branch, in parallel. The B segment has, similarly, two branches, a B1 and a B2 branch in parallel. Each of said four branches comprises or includes a switch means. The A1 branch has at least one or a first switch, a second switch is provided in the A2 branch, a third in the B1 branch, and a fourth in the B2 branch. The said switches are responsive to certain process variables, as described below, by operating means of known character. The first switch is responsive to a specific pressure, or if desired, a specific temperature in the reaction zone. The second and third switches are reciprocally responsive to the volume of liquid reagent fed in a particular operating cycle, and the fourth switch is responsive to a second specific pressure, or temperature, as desired in the reaction zone. The response of the switch means above enumerated is such that the motored valve, for the fluid being controlled, curtails fluid flow only when either of the following occurs; (a) a desired process condition, such as pressure or temperature, in the reaction zone is below the first specific level, and, a predetermined finite quantity of liquid reagent is being fed, or has not been completely fed, and (b) the finite quantity of liquid reagent has been fully fed, and a second desired process condition, e.g., pressure or temperature, is below a specific value.

It will be understood that numerous supplemental and additional features can be incorporated into the fluid flow control system outlined above, and such are illustrated in the detailed description hereinafter. Further, it will be clear from the detailed description that the flow of the fluid involved tends to affect the reaction by decreasing the process variable, such as pressure or temperature, to which some of the switch means are responsive. Generally, curtailing or terminating the fluid flow tends to increase said variable, or to decrease the rate of decrease.

Figure 2:
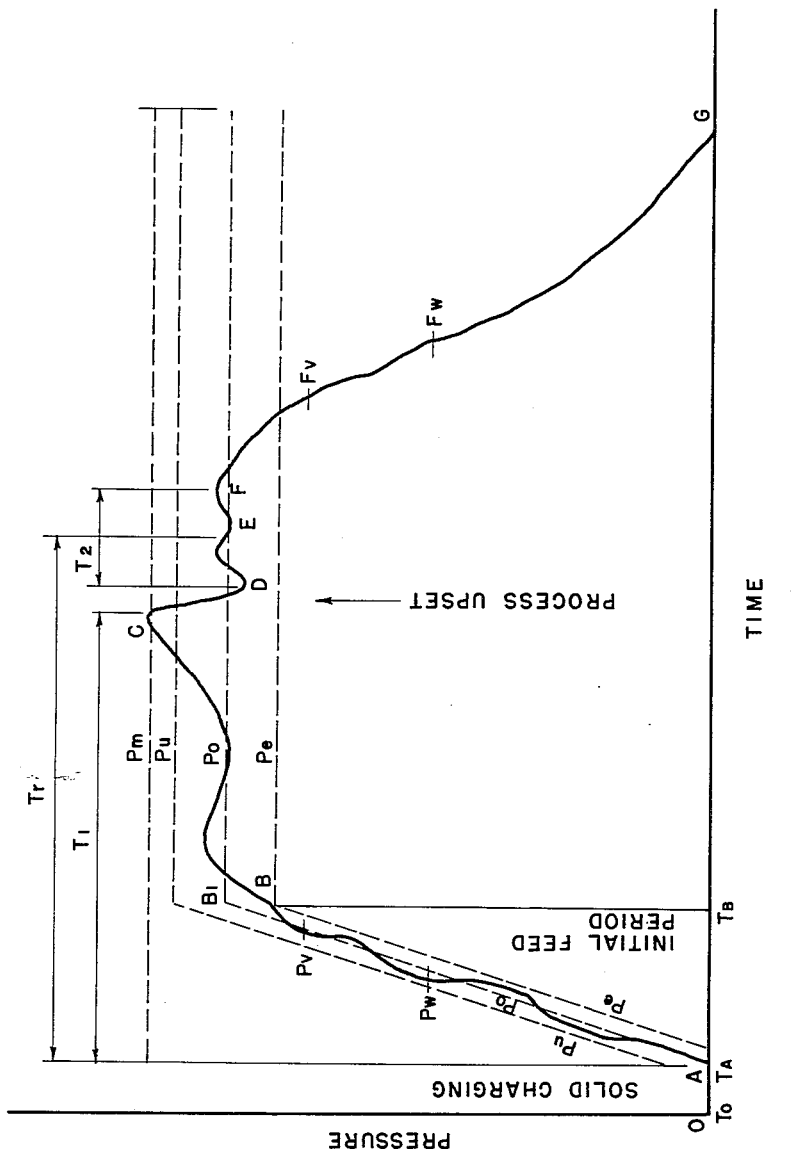
Figure 3:
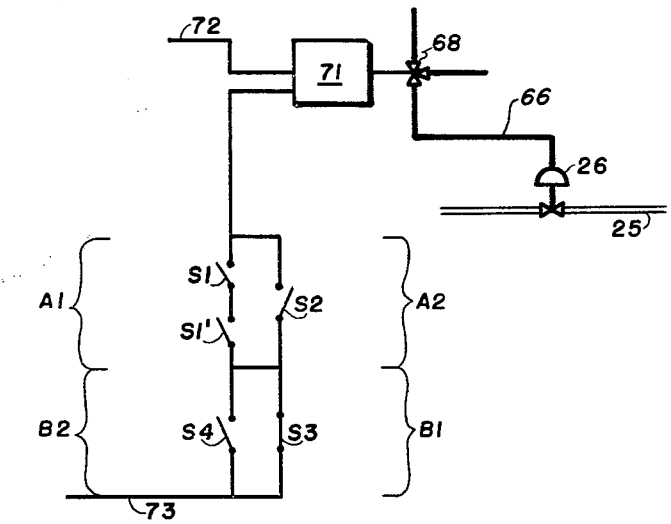
Figure 4:
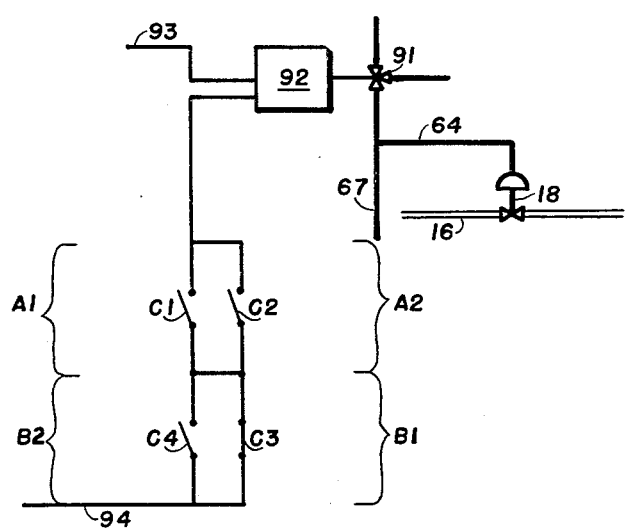

A full understanding of the invention will be readily obtained from the following description and figures. For clarity of presentation, a typical process cycle, as controlled by a preferred embodiment of the invention is illustrated firstly, followed by a more detailed discussion of the several mechanisms forming, or suitable for use in conjunction with, the present invention. The descriptions will be clear in conjunction with the figures wherein:

FIG. 1 is a general schematic process apparatus layout showing the reactor, condenser and several lines or conduits, plus the several mechanisms of a typical embodiment of the present invention, FIG. 2 is a graphical presentation of a typical operational sequence, i.e. a pressure-time plot with notations defining the operative effect of the varying control means, FIG. 3 is a detail, schematic representation of a highly preferred embodiment of the invention for controlled venting or inert purge gas and gaseous, non-condensable byproducts of a reaction, and FIG. 4 is a detail schematic representation of a similar embodiment provided for control of flow of water or other coolants to heat exchange portions of an apparatus.

Turning to FIG. 1, the main elements of apparatus include a reaction vessel or autoclave 11, and a reflux condenser 21. A charge pipe or stand pipe 12 surmounting the autoclave 11 body provides a vapor space and a zone for convenient tie in of several lines hereafter cited. (Hereinafter, the space of the standpipe 12 is considered to be identical with a part of the autoclave 11 space.) A liquid reagent feed line 41 provides for introducing the liquid reactant to the autoclave 11. A vapor line 13 provides for transmittal of vapors from the autoclave 11 to the reflux condenser 21. A liquid reflux line 14 is provided connecting the reflux condenser 21 and the autoclave 11, for return of condensed liquid. The autoclave body is desirably provided with a heat transmission fluid jacket 15, lines 16, 17 being provided for introduction and discharge of the coolant or heating liquid. A motored valve 18 in the inlet line 16 provides for control of flow of the heat transmission liquid. An emergency relief line 19 fitted with a relief valve 20 is provided for direct venting of excess pressure from the autoclave when necessary.

The reflux condenser 21 can be any of several different types, refrigerant flow being provided by an inlet line 22 and an outlet line 23. The flow of coolant is controlled by a motored valve 24 in the inlet line 22. A partial vent line 25 is provided for release of vapors from the condenser, a motored valve 26 in the vapor line 25 controlling the release of such vapor.

In the typical embodiment illustrated by this figure the flow of the liquid reagent is provided by a centrifugal pump 46, which receives liquid reagent through a main supply line 47. A discharge line 48 feeds a manifold 49, the supply line 41 of the present embodiment being one of several branches from this manifold supplying a series of parallel units. A return by-pass line 50 having an orifice 51 therein is provided around the pump 46 for reasons hereafter described.

A fluid volume meter 42 is positioned in the supply line 41 for measuring the quantity of liquid. An indicating dial 43 provides a record of the integrated quantity of liquid reagent. A case 44 houses the volume integrating mechanism and other means hereafter described which are operatively connected with the meter 42.

A motored valve 45 is positioned in the liquid reagent line 41, for controlling the flow of the liquid reagent.

A case or "station" 56 contains several means including the vital control mechanisms of the invention, described in more detail hereafter. Included among the means in this "station" are a pressure responsive element and indicating and recording mechanism associated therewith, a time-pressure record being usually provided on a chart 57. Certain of the elements in this station may include electrically driven motors and other elements; the current for their operation being provided through electrical leads 58. A master switch 59 is provided for initiating action.

Various sensing and actuating "conduits" are provided joining the elements within the station 56 and the several devices for controlling the process. The term "conduits" refers to both electrical lines and pneumatic pressure conduits, both electrical potential and air pressure being utilized, and, in some instances, both being equally suitable for a specific function. These conduits include a line 61, for transmitting autoclave pressure to a pressure responsive element. A compressed air line 62 leads to the motored valve 45 from the station 56, for actuating and positioning the valve 45 to achieve a pre-scheduled time-pressure history within the autoclave 11. An electrical line 63, from mechanism associated with volume integrating mechanism in the volume meter case 44, passes to the station 56 to interrupt actuating pressure therein and thus cause closure of the motored valve 45. Generally, the motored valve 45 for control of liquid reagent feed is of the air-to-open type.

Another air impulse line 64 leads from means in the control station 56 to a motored valve 18 in the inlet line 16 to the autoclave coolant, for initiating coolant flow upon attainment of a desired pressure in the autoclave 11. Still another air transmission line 66 leads from means in the control station 56 to the motored valve 26 in the vent line 25 from the reflux condenser 21. Yet another air line 67 is provided leading from means in the control station 56, to the motored valve 24 in coolant fluid line 22 to the reflux condenser 21.

An electrical lead line 68 connects counting or integrating means in case 44, associated with the volume meter 42, for zeroing the mechanism of the volume counter.

It will be obvious that the elements described above, for full effectiveness, require intimate correlation of operation. These correlations are attainable by a variety of means as described in more detail hereafter. Prior to describing these more fully, it will be helpful to describe a graphic representation of a typical batch operating cycle. For purposes of illustration, the cycle is described with reference to the ethylation of the lead of a comminuted sodium-lead alloy to form tetraethyllead. Similar pressure time patterns, differing quantitatively, would be presented for other reacting systems.

Turning to FIG. 2, a typical plot of autoclave operating pressure against time is shown. The initial step of a cycle is a brief period OA for charging solids to the autoclave. Most of the remaining portion of the time cycle is taken up with the reaction, represented by the curve ABCDEFG.

The initial portion of this reaction curve is a rapidly rising pressure period AB. During this portion, a time mechanism moves an indicating set point element to provide a rising pressure schedule path $AB_1$. Dependent upon the particular means utilized, this path may be a straight line or a series of small steps approximating a straight line. The differential pressure between this schedule path $AB_1$ and the actual autoclave pressure, represented by the curve segment AB, provides a motivating force or increment which is employed to initiate controlling impulses which govern the flow of liquid reagent feed. It has been found that a controlling device of the proportional band type is quite satisfactory in this service, although a proportional band with automatic reset can be desirably used in some instances. Thus, designating the desired operating pressure path as $P_o$, parallel pressure paths represent an upper limit $P_u$ and a lower limit $P_1$ of the proportional band.

When the rising pressure control or set point reaches a predetermined pressure level $P_w$ means are activated which initiate a flow of cooling medium through the autoclave jacket. As the pressure set point rises further to a point $P_v$ means are provided to actuate a normal partial venting operation. However, since in this particular system the reaction space is initially filled with inert non-condensable gas, provision is made to release the inert gas during the initial portion of the rising pressure period. In other words, the partial venting control mechanism is subject to a supplementing control during this segment of operation.

When the rising pressure schedule reaches a point $B_1$ the operation of the rise timer, moving the set point element mentioned above, is discontinued, and normal automatic control is initiated to maintain the autoclave pressure in the constant pressure band represented by an upper pressure limit $P_u$ and the lower pressure level $P_1$, starting at time $T_B$. This control is effected primarily by the rate of feed of the liquid reagent.

We now return to the process variables to which the controlling means are responsive and initiate or terminate operations for the control of the process. In addition to the operating pressure level $P_o$ (and the proportional band $P_u$ to $P_1$), a maximum pressure limit $P_m$ is applied in most embodiments of the apparatus of the invention. Whereas any actual pressure variation within the pressure band merely results in operation of the control means actuating the feed of liquid reagent, if the actual pressure rises to the overriding maximum pressure (as at point C) the control operations are interrupted. In other words the control means are disconnected. This results in a stopping of the timing element and a shut off of all flow of liquid reagent. The timing element provides, generally, a limit of the total time period during which liquid reagent can be fed. In normal operations, this time lapse is an uninterrupted period. In the present instance, selected as an unusual cycle, the running of this timed interval is interrupted by the occurrence of the maximum pressure $P_m$ at point C. When the pressure has been reduced to a point D below the desired operating range, the control means are restarted manually. In this cycle, then, the timed portion includes two segments, one segment $T_1$ being from the start of liquid reagent flow to the occurrence of the shut down pressure C. The second segment $T_2$ runs from the time of restarting of the apparatus. When the timed interval has run (whether it is a continuous period or includes several segments, as above described) means are provided for terminating the air output to the motored valve admitting liquid reagent. In other words, the controlled system is deactivated from this point so that flow of liquid reagent is stopped.

An overriding control step is, however, provided independently of the above described time lapse, this control step operating to terminate the flow of liquid reagents when a pre-selected total quantity has been provided. The time for this integrated quantity of feed is, of course, variable, and is indicated graphically as $T_r$. It is thus apparent that the feed of liquid reagent is terminated, in the cycle illustrated by FIG. 2, at point E before the lapse of the full time allotted by the timing means, which discontinues the air to the motored valve at point F.

At point E, then the total quantity of liquid reagent has been introduced and the reaction is near completion. At point F the time allotted for the control mechanism has elapsed. At this point, then, means are provided which isolate the controller from the motored valve which controls the feed of liquid reagent. However, in the present cycle the flow of liquid reagent has already been terminated by the feed of the preselected quantity of liquid reagent as described above. The pressure in the reaction system begins decreasing after discontinuing the ethyl chloride feed, or shortly thereafter. When a predetermined pressure $F_v$ is reached, partial venting after condensing, to release only non-condensable gases, is stopped. The apparatus of the present invention, applied to a venting control system, provides for a termination pressure $F_v$ which is independent of the first venting pressure $P_v$. In other words, employing the present apparatus, the final pressure can be above, or equal to or below, the initial venting set pressure. If desired, the final process variable to which the venting is responsive can be a different variable, e.g., temperature. At a pressure $F_w$, which can be the same or slightly below the pressure $F_v$ at which the non-condensable venting is ended, the flow of cooling medium to the reactor jacket is terminated. At this pressure range full venting is started, that is, the compressed vapors are released to a recovery system without refluxing. The pressure is thus lowered to atmospheric pressure, and the reactor can then be discharged. Full venting, in contrast to the controlled partial venting operation already mentioned is at a potentially much higher rate. Whereas the controlled venting, when at a maximum rate, does not rapidly affect the reaction pressure, the full venting can release sufficient vapors to reduce the pressure relatively quickly.

To fully understand the interrelationship and mode of operation of the several elements forming the apparatus of the invention, the following gives a more detailed description of typical units arranged generally as shown in FIG. 1. As noted more specifically hereafter, various alternatives for the several units are possible without departing from the spirit of the invention.

The control station 56 includes a pressure indicating means and, usually, a pressure recording device. The pressure indicator may be of the conventional Bourdon tube type with linkage to an indicating pointer and pen. A timer driven chart is provided so that a continuous record of actual pressure can be made. The operation of this timer is desirably always continuous and independent of the control apparatus, so that a pressure record is provided without regard to the controlling operations. Associated with the pressure sensing and recording means are primary controlling means for controlling the flow of liquid reagent. These means include a rate of rise timer. The rate of rise timer can be a constant speed electric motor with appropriate mechanism operatively connected to any driven element. This timer changes the position of a movable pressure proportional element or set point, which may include a scale pointer and pen, in accordance with a predetermined rise with time schedule, until a desired pressure is reached. The set point rise time pattern is usually a step pattern, but means can be provided to give a linear pressure rise pattern. When the set point attains a position corresponding to a desired operating pressure, the operation of the rate of rise timer is terminated and operation of a hold timer is initiated. A primary controlling mechanism is operatively connected to the pressure indicating element. This mechanism is suitably of the conventional pneumatic type, wherein a movable flapper is used to partly or completely throttle a stream of instrument air emitted from a nozzle. Variation in pressure of air in the line feeding the nozzle is transmitted either directly or indirectly, to an operated element, in this instance, an air motored valve 45 for control of the flow of liquid reagent. Generally, the motored valve should be of the air-to-open type.

In addition to the above described control means associated with the pressure gauge and rise timer, further control means are desirably provided to initiate flow of the cooling fluid for the reflux condenser 21, for flow of cooling water through the autoclave jacket 15, and for venting of non-condensable by-product gases through the vent line 25. The control means for control of coolant liquid flow desirably is an air motored valve although an electrically motored valve can be employed. Thus an air impulse can be transmitted through line 64 to allow flow of cooling water by the valve 18, through line 16. Similarly, refrigerant or water flow to the reflux condenser 21 can be initiated by air pressure transmitted by line 67 to the motored valve 24, admitting refrigerants through line 22. In the case of the control mechanism for the controlled venting operation, similar mechanism is desirably employed to activate motored valve 26 by pressure transmitted through line 66. In the present invention, as already mentioned and described more fully below, coupled with this control element is electrically operated means responsive to a plurality of process functions.

In addition to the rise timer mentioned above, also a part of the pressure recorder-primary controller apparatus is a hold-timer which provides an overriding total time control. This timer is suitably a constant speed electric motor and appropriate gearing or other linkage. Its operation is initiated at the end of the operation of the rate of rise timer, or if desired at the same time. When a finite elapsed time has expired and has been measured, switch means associated with the hold timer terminates the output of air pressure through line 62 to the motored ethyl chloride valve 45, thus resulting in its closure. This operation does not occur, of course, if the feed of liquid reagent has already provided the desired total quantity (as in FIG. 2).

A particular feature of certain preferred embodiments of the invention are means for discharging inert purge gas in the autoclave space, this being a residuum from a preceding cycle. Thus, the apparatus shown in FIG. 3 provides for two types of venting, i.e., release of inert residual gases and venting of newly formed non-condensable gases.

Referring to FIG. 3 a schematic diagram is given showing the venting system. The system includes, in addition to the motored valve 26 in the vent line 25 a coil or relay 71, a valve 68 and an energizing circuit for the coil 71. The circuit is fed by lines 72, 73 which, desirably, connect to the main power line 58 (see FIG. 1). The venting system is thus activated concurrently with the other elements of the control system. The energizing circuit includes a portion comprising the coil 71, and a second portion in series therewith, the second portion including two segments, an A segment and a B segment, in series, each of said segments including two branches in parallel. Thus, the A segment includes an A1 branch and an A2 branch, and the B segment includes a B1 branch and a B2 branch. Switch means are included in each of said branches, the switch means in each instance being responsive to process variables heretofore described. By responsive is meant that the switch is opened and closed, or, alternatively, closed and opened, during duration or absence, respectively, of a signal or power pulse emanating from one or more of the other control means. The signal may be either pneumatic or electrical, dependent on convenience, available space, or reliability. In some instances, mechanical linkage means are fully adequate. In most instances, electrical means are preferred.

In preferred embodiments, the vent control valve 26 is of the air-to-close type. In addition the coil 71 is mechanically linked to the valve 68, controlling air to motored valve 26 in such a manner that the coil 71 must be energized to open valve 68, to feed air through line 66 to motored valve 26, to terminate the venting. In other words, the coil 71 must be energized to close the vent valve and interrupt venting. This provides a highly desirable fail safe system.

Detailing the switch means, then, in the branch A1 are the two switches S1, S1'. The first switch S1 is actuated by conventional means responsive to the actual reaction system pressure, so that if the actual pressure exceeds a first fixed vent pressure (e.g., $P_v$ of FIG. 2) the switch is opened. The supplemental switch S1' is also responsive to a process or control condition, preferably a pre-selected set point pressure or value. Below this value, the switch is open, thus assuring venting. The value can be above, below or equal the fixed vent pressure. If the value is above, then venting is assured until after the first switch S1 is normally opened. Continuous venting during the rising pressure period and elimination of residual purge gas is thus provided. In a different arrangement supplemental switch S1' is closed or opened when the actual pressure is below or above, respectively, the set point, during the rising pressure period.

In branches A2 and B1, single switch means S2, S3 in each branch are linked together, in effect, as a two contact switch, i.e., when one is closed, the other is open. These switch means are actuated by means responsive to the reaction time, as measured by the rise timer and/or the hold timer. In addition, the switch actuating means is responsive to the volume integrating mechanism. Further, in most preferred embodiments, the switch may be responsive to the agitation of the reactants of the process. The most important of these three factors is the volume element. However, when all three process attributes are to be included, suitable means for actuating the switch means S2, S3 would be an electrical relay not shown, which is energized only when three switch means, not shown, are closed concurrently. These three switches would be responsive to the operation of the timing means, the volume integrating means, and the process agitator.

In the last branch B2, the switch means S4 therein is responsive to the actual pressure in the reaction space, with reference to a different pressure set point than the first vent point pressure $P_v$ to which the switch means S1 is responsive. By different is meant a set point which becomes operative at a different portion of an operating cycle. However, the numerical value of the set point may be the same as (as, for example $F_v$ in FIG. 2), above, or below the initial vent pressure point. This switch S4 is aligned to be closed when the actual pressure drops below the final vent pressure point.

Turning to the actual operation of the system, with reference to FIG. 3 and to FIG. 2, during the duration of feeding liquid reagent, as measured, by volume, and during a feed and following high pressure period as timed, the switch S3 is closed, and switch S2 is open. Further, in preferred embodiments, operation of the agitator is also required for closure of switch S3. During a rising pressure period, or initial feed period, the switch S1 is closed until the pressure is equal to the first specific vent pressure $P_v$. In addition supplemental switch S1' is open, so coil 71 is deenergized and the valve 26 remains open. When the set point value is at or above the desired value, the supplemental switch S1' closes, so the position of the first switch S1 controls energizing of the circuit and closure of valve 26. In the alternative and less preferred arrangement, during the rising pressure period the supplemental switch S1' closes when actual pressure is below the set point pressure, thus restricting venting in such instances.

From the foregoing it is seen that according to the preferred embodiment, during the initial, rising pressure period, continuous venting is provided until attaining the preselected set point value at which supplemental switch S1' closes, and then relationship of the actual pressure to the said first vent pressure is controlling. Overriding these control effects is the necessary concurrence, in preferred embodiments as described, of (a) feeding of the liquid reagent, (b) the non-expiration of a predefined reaction time, and (c) the agitation of the reaction system. The termination of, or interruption of any of these process attributes would open switch S3 and thus de-energize coil 71, causing venting to occur. It will be understood that switches S2, S3 can, if desired, be responsive solely to one process variable or step, instead of a plurality in concurrence.

After completion of the normal feed (as, for example the period $T_r$ of FIG. 2) the switch S3 is opened, and concurrently the switch S2 in branch A2 is closed. At this point the switch S4 becomes controlling, in that the valve 26 will not be closed until the actual operating pressure decreases below the final venting pressure $F_v$.

As indicated heretofore, the apparatus of the present invention is applicable equally effectively to the control of other fluids. Thus, the system is highly effective for controlling, cooling water flow or condenser refrigerant, in the reaction apparatus described in connection with the preceding example, and shown in FIG. 1. Such an embodiment is illustrated by FIG. 4.

In FIG. 4, an apparatus is shown which is very similar to the apparatus of FIG. 3. In this instance, however, the motored valve 18 is in the feed line 16 for cooling water to the autoclave jacket 15. The motored valve 18 is actuated by air supplied by air line 64. If desired, a branch line 67 can be tied in, communicating and actuating a motor valve 24 in the refrigerant feed line 22 to the reflux condenser 21 (FIG. 1). Flow of actuating air is controlled by valve 91 in air line 64, said valve being controlled or actuated by a coil or relay 92. Power to the circuit is provided by lines 93, 94 which, desirably, connect to the main power supply 58 (see FIG. 1). The second portion of the circuit again includes two segments of two parallel branches each A1, A2 and B1, B2. Switch means $C_1$, $C_2$, $C_3$, $C_4$ comprise said branches. As in the preceding example, the second and third switch means $C_2$, $C_3$ are reciprocally responsive, by means not shown, to at least the feeding of liquid reagent. The first and fourth switches $C_1$, $C_4$ are responsive, respectively to a specific pressure, at the start of a cycle and near the end of a cycle, respectively. Thus, the first switch $C_1$ would be closed when the initial reaction pressure is below a certain level, e.g., $P_w$ as in FIG. 2. During the last portion of a cycle, the fourth switch $C_4$ would be closed after the autoclave pressure has dropped below a desired value $F_w$. The final control pressure $F_w$ can be equal to, above or below the initial pressure for control, as desired.

A significant feature of preferred systems to which the present invention is applied is the overriding control or limit mechanism based on the quantity of liquid reagent fed. Generally, this portion of the apparatus includes a volume meter and appropriate means to terminate the flow of liquid reagent when the total volume is attained. Such means can suitably be an electrical circuit initially closed or made by a start circuit which initiates action of the volume meter (as well as the timing means already discussed). The closure of this circuit can activate or energize a solenoid, positioning a solenoid plunger which is linked to a flapper. When so positioned, this flapper closes a nozzle which terminates a branch instrument air line. The discharge capacity of this nozzle is relatively high. Thus, when it is opened, there will be no build up of air pressure by the normal flapper action and hence no operation of the motored valve. Conversely, when the first mentioned nozzle is closed, build up of air pressure occurs in the normal fashion, for control of operations of the motored valve. The overriding action of the volume limit control is accomplished by a switch associated therewith which opens the electrical circuit, de-energizing the solenoid, and removing the flapper from the nozzle. This permits the controlled air to be vented, thus, in effect, preventing output air to the motored valve for the feed of liquid reagent.

In order to describe a typical electrical interrelating circuit arrangement the following describes the functions of the several mechanisms in the course of a batch operation such as was described with reference to FIG. 2.

Upon completion of the charge of solid reagent, and closure of the autoclave, the operator depresses a start button switch. By appropriate electrical circuits, this press operation energizes a circuit for resetting the hold timer or rezeroing. In addition it resets the set point of the pressure controller mechanism to zero, and also resets the volume meter or counter 42 to zero.

Release of the start button also performs several functions, including energizing an air outlet overriding coil or solenoid heretofore described. In other words it energizes the solenoid which permits buildup of general instrument air supply under the influences of the primary control mechanism and nozzles. The start button release also initiates operation of the rate of rise timer mechanism. This mechanism suitably includes a constant speed motor driving adjustable cam type switch. This switch provides for intermittent operation of a constant speed motor driving the set point element, and provides stepwise increase of the pressure set point on a time cycle. Release of the start button also energizes the volume integrating means in case 44, which is provided with a lock in mechanism so that it can be rezeroed only by the pressing of a normal starting button and only after having once reached its set point. Upon release of the start button, also, the fluid flow control mechanism of the present invention is again activated.

As the set point of the control mechanism reaches a desired operating pressure $P_o$ (see FIG. 2) a switch is closed which by appropriate relay means disconnects or de-energizes the rise timer and rate motor and energizes or initiates operation of the hold timer.

The operation of the flow control systems of the present invention, e.g., the venting system, and the coolant flow control system, is as already described. It is seen that such systems provide a highly effective apparatus which controls the desired flow in response to a process variable which is most important during an existing portion of a cycle of operation. Thus, in the case of the venting system, during the first part of the rising pressure period, the venting is responsive to any deviation of actual pressure from the rising set point pressure. During the major portion of the reaction, the venting is responsive to the existence of the first specific venting pressure (e.g. Pv of FIG. 2) but is subject to an overriding control, i.e. the feed of liquid reagent or the nonexpiration of a set timer, or the operation of the agitator, or the concurrence of two or more of these variables. During the final portion of the cycle, the venting is automatically responsive to the second venting pressure (e.g. Fv of FIG. 2).

As already described, a variety of "upset" factors may occur which would cause a process interruption. These are the attainment of a maximum pressure $P_m$ (see FIG. 2), or if the pressure in the feed line 41 (see FIG. 1) drops below the necessary level. These events provide operations as described below, and in addition if the predetermined volume of liquid is passed through the volume meter 42 results in a signal from the integrating mechanism in the case 44, a comparable function occurs. This function is the closure of switches which energize a relay which in turn de-energizes the overriding air output solenoid and also the power input to the hold timer. Thus, the occurrences of any of the above three events results in immediate termination of flow of the liquid ethyl chloride reagent.

Upon correction of the upset condition or conditions mentioned above (viz. the attainment of an autoclave pressure within the control band (a pressure between $P_u$ or $P_l$) or the attainment of sufficient ethyl chloride feed line pressure) then an emergency start button can be depressed. Pressing the emergency start button de-energizes the relay mentioned above, thereby allowing resumption of operation of the hold timer and again energizing the overriding air output solenoid.

It will be apparent to those skilled in the art that appreciable variation is permissible in the fluid flow control means, without departure from the scope of the invention. Some of these variables are mentioned below.

As already discussed, the motored valves of the apparatus are usually of the normally closed type, requiring motor operation to open. Valves of the air-to-close type can also be used, and in this case, appropriate reversal of the additional components will be provided.

Generally, it is preferred that the actuating medium or power source for the several mechanisms be electrical power and compressed air, as specifically described above. However, in many instances alternative power sources can be utilized. For example, instead of utilizing air energized motors for the partial vent valve 26 or the liquid reagent feed valve 45, electrically energized motors or even mechanical linkages can be employed. Similarly, instead of constant speed electrical motors for driving the timed elements, spring driven clock work mechanisms can be provided.

This application is a continuation-in-part of my prior patent application Serial No. 609,315, now U.S. Patent 2,863,737 granted December 9, 1958.

Having fully described the present invention, what is claimed is:

1. In an apparatus for carrying out an exothermic chemical batch reaction involving a mass of comminuted solid and a pressurized highly volatile fluid, the combination of a reactor container, a temperature measuring means connected for indicating the temperature in the container, a feed mechanism connected to the container to supply a reactant during the course of the reaction and having a measuring means for measuring the quantity of reactant fed, a coolant fluid conduit in heat-exchange relation with the container, agitating mechanism within the container for agitating the mass of solid during the reaction to improve the temperature uniformity throughout the mass, the agitating mechanism including a sensing means indicating when no agitation is taking place, said container having a vent for relieving its internal pressure to cause some of the highly volatile fluid to volatilize off and absorb heat thereby cooling the container contents, timing means connected for indicating the duration of a reaction begun in the container, and fluid flow control means connected to supply the above cooling action, said flow control means including a first control connected to the temperature measuring means to establish cooling action in response to a predetermined excessive temperature in the container, a second control connected to the temperature measuring means to establish cooling in response to a container temperature above a predetermined low temperature, and shift elements connected to the feed measuring means, timing means, agitation sensing means and flow control means to cause the flow control means to be actuated only by the first control in response to the simultaneous (a) lack of completion of the reactant feed, (b) lack of completion of a predetermined reaction time, and (c) operation of the agitator, said shift elements being also connected to cause the flow control means to be actuated only by the second control in response to any other combination of reactant feed, reaction time and agitator operation conditions.

2. The combination of claim 1 in which the fluid flow control means includes biasing elements connected to maintain fluid flow and establish cooling when the remainder of the flow control means is inoperative.

3. In an apparatus for carrying out an exothermic chemical batch reaction involving a mass of comminuted solid and pressurized highly volatile fluid, the combination of a reactor container, a feed mechanism connected to the container to supply a reactant during the course of the reaction and having a measuring means for measuring the quantity of reactant fed, agitating mechanism within the container for agitating the mass of solid during the reaction to improve the temperature uniformity throughout the mass, the agitating mechanism including a sensing means indicating when no agitation is taking place, said container having a vent for relieving its internal pressure to cause some of the highly volatile fluid to volatilize off and absorb heat thereby cooling the container contents, timing means for indicating the duration of a reaction begun in the container, and fluid flow control means connected to operate the vent and thereby supply cooling, said flow control means including a first control connected to open the vent in response to a predetermined excessive pressure in the container, a second control connected to open the vent in response to a container pressure above a predetermined low pressure, and a shift mechanism connected to the feed measuring means, timing means, agitation sensing means and flow control means to cause the flow control means to be actuated only by the first control in response to the simultaneous (a) lack of completion of the reactant feed, (b) lack of completion of a predetermined reaction time, and (c) operation of the agitator, said shift means being also connected to cause the flow control means to be actuated only by the second control in response to any other combination of reactant feed, reaction time and agitator operation conditions.

4. The combination of claim 3 in which the first control includes an auxiliary control section connected to hold the vent open so long as the pressure is below a predetermined purging pressure for removing non-condensible gas present at the start of the reaction.

References Cited in the file of this patent

UNITED STATES PATENTS 2,863,737    Green _____ Dec. 9, 1958